April 7, 1925.
A. P. BAMFORD
1,532,221
SIGNAL MEANS FOR AUTOMOBILES AND THE LIKE
Filed May 15, 1922     2 Sheets-Sheet 1
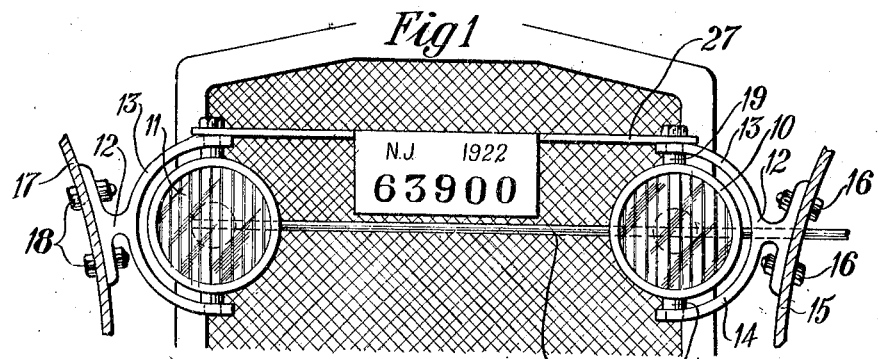
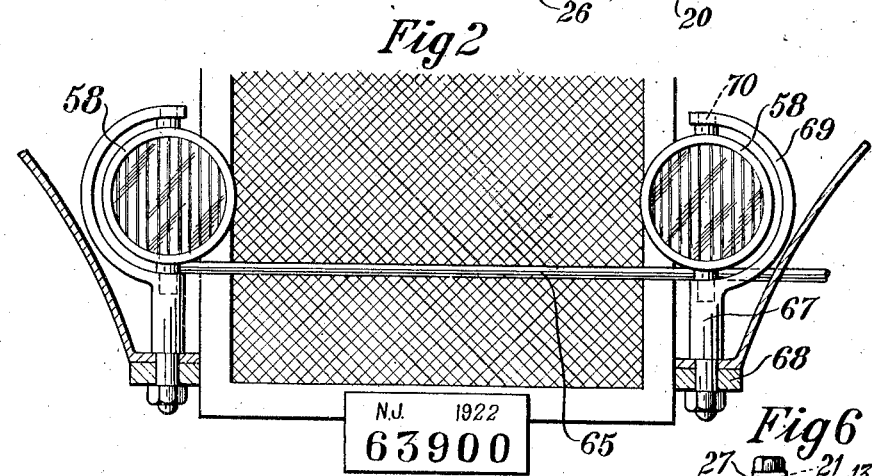
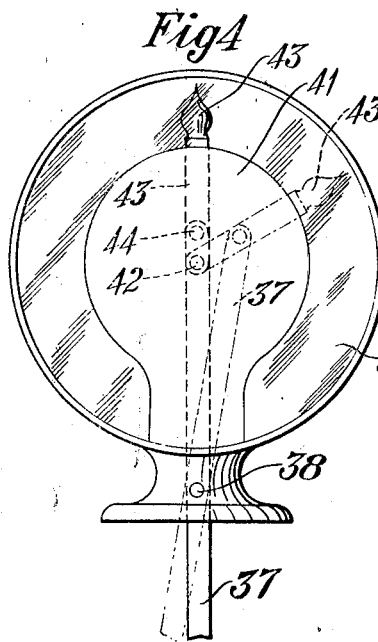
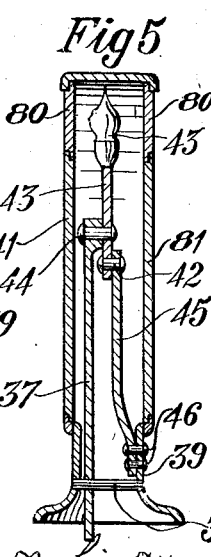
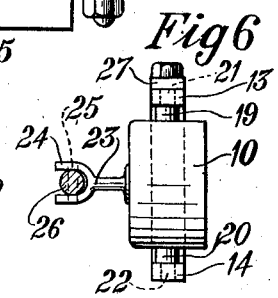

April 7, 1925.
A. P. BAMFORD
1,532,221
SIGNAL MEANS FOR AUTOMOBILES AND THE LIKE
Filed May 15, 1922 2 Sheets-Sheet 2
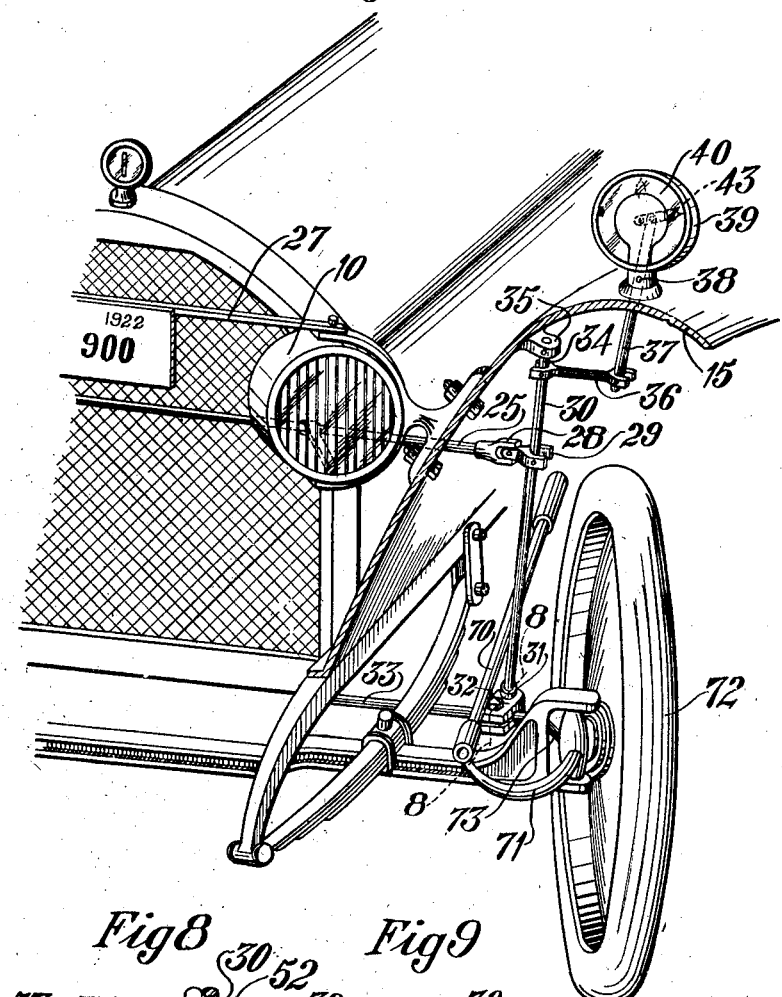
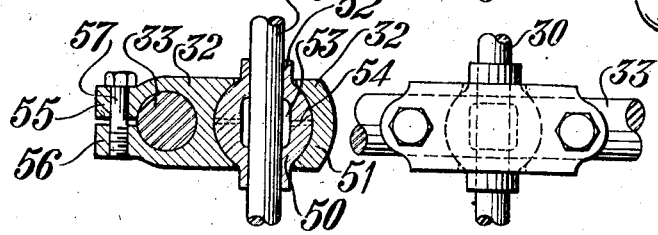

Patented Apr. 7, 1925.

1,532,221

UNITED STATES PATENT OFFICE.

ARTHUR P. BAMFORD, OF IRVINGTON, NEW JERSEY.

SIGNAL MEANS FOR AUTOMOBILES AND THE LIKE.

Application filed May 15, 1922. Serial No. 561,151.

*To all whom it may concern:*

Be it known that I, ARTHUR P. BAMFORD, a citizen of the United States of America, residing at Irvington, county of Essex, State of New Jersey, have invented certain new and useful Improvements in Signal Means for Automobiles and the like, of which the following is a specification.

This invention relates to signal means for automobiles and the like.

An object of this invention is to provide for means regularly supplied to an automobile, such as the front lamp or lamps, whereby the course of travel of the vehicle is indicated.

A further object of the invention is to provide supplemental indicating means, preferably observable during day-light as well as in the dark for indicating the course of the vehicle.

Pursuant to one of the more preferred forms of the invention, my invention comprises improved means for mounting one or more of the lamps of an automobile to afford indication of a turn to the right or to the left and controlled automatically upon the turning by the operator of the steering wheel in correspondence to the desired change from the straight-ahead course. The supplemental indicating means comprises preferably a movable indicator mounted on a mud guard of the vehicle or the like to be observable forwardly and rearwardly of the automobile and operated automatically with the lateral shifting of the head lamp or lamps.

Further features and objects of the invention will be more fully understood from the following description and the accompanying drawings, in which Fig. 1 is a front elevation of an automobile provided with a pair of vertically pivoted head lamps operable pursuant to my invention from the steering wheel;

Fig. 2 is a front elevation similar to Fig. 1, but showing a modified form of pivotal mounting means for the head lamps;

Fig. 3 is a perspective view showing in detail the forward portion of an automobile and a head-lamp mounted pursuant to the arrangement shown in Fig. 1 and connected with the steering gear controlling the front wheels of the automobile and a supplemental indicating means mounted on the front left mud guard;

Fig. 4 is a front elevation, on an enlarged scale, of the indicating means mounted on the mud guard;

Fig. 5 is a vertical central sectional view of Fig. 4;

Fig. 6 is a detail side elevation of a head-lamp shown in Fig. 1 and mounting and operating means;

Fig. 7 is a detail side elevation of a head-lamp shown in Fig. 2, and

Figs. 8 and 9 are respectively a vertical central sectional view on line 8—8 of Fig. 1, and rear elevation of a member connecting the lamp and indicator with the transverse reach rod of the steering gear.

Referring to Figs. 1 and 3, the front head-lamps are shown at 10, 11 respectively. In this instance, both head lamps 10, 11 are arranged to be turned to the left to indicate divergence from straight-ahead course to the left of the steering wheels of the automobile and both to be turned to the right to indicate turning of the car to the right upon corresponding turning of the steering wheel. If desired, but one head-lamp may be so operated, and the other head-lamp may be mounted as usual to be stationary.

One preferred form of such horizontally oscillatory mounting of the head-lamps 10, 11 is shown in Fig. 1 and may comprise a bracket 12 suitably secured to a mud guard or otherwise fixedly to the automobile; such bracket 12 may have an upwardly extending arm 13 and a downwardly extending arm 14. The left-hand bracket 12 is shown secured to the left-hand front mud guard 15 by means of the bolts 16, 16 and the right hand bracket 12 is shown secured to the right-hand front mud guard 17 by means of the bolts 18.

Each casing of the head-lamps 10, 11 is provided with an upwardly extending lug 19 and a downwardly extending lug 20 for pivotal connection with the arms 13, 14 respectively of its bracket 12; to provide for preclusion of audible vibration, each pivot lug 19, 20 is preferably of relatively large diameter serving as a washer portion between the casing to the inner face of its bracket arms 13, 14 and of reduced diameter for its portion extending respectively through an opening 21 in the upper bracket arm 13, and likewise through the opening 22 in the lower bracket arm 14.

Each casing of the head-lamps 10, 11 is further provided with an arm 23, see Fig. 6, preferably having a forked terminal portion 24 for pivotal connection by means of a pin 25 with the control rod 26 operated by the steering gear of the automobile.

The upper arms 13, 13 of the right-hand and left-hand brackets 12 may be connected with one another by means of the brace rod 27.

The control rod 25, see Fig. 6, may be connected in any suitable manner with the steering gear of the automobile and in the drawings I have indicated, see Fig. 3, such connection by providing the left-hand end of the control rod 25 with the universal joint members 28, 29, the latter being pivotally connected to the vertically extending rod 30 connected at its lower end 31 by means of the coupling 32 with the reach rod 33 of the steering gear of the automobile. The upper end 34 of the rod 30 is loosely pivotally mounted in the bracket lug 35 secured to the under face of the left-hand mud guard 15. Adjacent the upper end 34 of the rod 30 is connected one end of the link 36; the other end of the link 36 is connected to the oscillatory arm 37 pivoted at 28 within the casing 39 of the supplemental indicator 40.

Preferably the supplemental indicator, as is shown enlarged in Fig. 4, comprises an opaque central screen 41 on each of the front and rear faces of the casing 39, between which screens is pivotally mounted at 42 the indicator member 43 having a finger, arrow or the like extending beyond the respective forward and rearward screens 41. The oscillatory control rod 37 may be pivotally connected to the indicator finger member at 44. The straight-ahead position of the finger member 43 is vertically upward as is indicated in full outline in Fig. 4 and the position indicated in dot and dash outline at 43a of the finger member and the extent of displacement from its vertical position corresponds to the extent of turning to the left of the steering wheels of the automobile, and corresponds likewise the extent of shifting of the reach rod 33 to the right ensuing upon turning the steering wheel to effect the indicated extent of turning of the steering wheels, as indicated in Fig. 3.

As one form of mounting for the indicating finger member 43, I have illustrated in Fig. 5, the vertically extending bracket 45 fixedly secured at its lower end to the casing 39 by rivets 46 or the like.

The indicator 43, as shown, may be in the form of a lamp connected by suitable wiring with the lighting circuit of the automobile. Such lamp may have a bulb of glass or like transparent material, which may be colored red, green or like conspicuous color. If desired, the indicator 43 may not be self-illuminating but may be coated with aluminum or like highly reflecting color and a lamp located between the forward and rearward screens 41, 81 and connected with the lighting circuit of the automobile; a red colored lamp may also be disposed between the screens 41, 81 and connected in circuit to serve as a parking light when the automobile is parked.

As one preferred form of coupling member 32 connecting the vertically extending control rod 30 with the reach rod, 33 of the steering gear, such coupling member 32, as indicated in Figs. 8 and 9, may comprise the circularly recessed ball 50 and socket member 51, forming a universal joint. The axial recess 52 of the ball member 50 makes a fairly snug fit with the control arm 30 but provides for movement longitudinally of the control arm 30 up and down relatively to the ball member 50, incident to different extents of turning. The ball member 50 is preferably hollowed at 53 to attain increased resiliency and also to serve as a space for lubricant, for the sliding joints between the rod 30 and the ball member 50 and also for supplying lubricant between the outer face of the ball member 50 and the socket member 51 through small feed openings 54, or the like. The reach rod 33 is shown secured to the coupling member 32 by means of the clamp extensions 55, 56 connected adjustably with one another by means of the set bolt 57.

In Figs. 2 and 7 another modification of pivotal mounting of the head lamps is illustrated, wherein the casing 58 of each head lamp is provided with an upwardly extending pivot lug comprising the relatively enlarged washer portion 59 and the reduced pivot portion 60. From the lower, portion of the lamp casing 58 extends a lug having a lower reduced pivot portion 61 and an intermediate portion of rectangular or other polygonal cross section about which is secured the end of the arm 63 having an opening at its end 62 of similar cross section and making a fit therewith. The opposite end 64 of the arm 63 is forked, as indicated, for pivotal connection with the control rod 65 by means of the pivot pin 66. Such arrangement provides for a bracket 67 of modified form, constructed to be vertically secured to the chassis 68, as is indicated in Fig. 2, and having a curved, upwardly extending arm 69 provided at its upper end with the opening 70 for reception of the pivot pin 60 of the lamp casing 58.

The steering gear illustrated in the drawing is an approved type in common use today and in addition to the reach rod 33 referred to hereinabove includes the arm 70 operated at its rearward end by the steering wheel shaft and connected at its forward end with the curved lever 71 for directly turning the left-hand front wheel 72; and further includes an arm 73 connected at one end secured to the hub of the left-hand front wheel 73 and pivotally connected at its free end to the left-hand end of the reach rod 33. The right-hand end of the reach rod 33 is connected in a similar or in any other approved manner to the hub of the right-hand front wheel.

However, my arrangement hereinabove described may be operated with any other type of steering gear.

From the above, it will be understood that my invention provides for the indication by means of the head lamp or head lamps when observable or by means of the direction indicating means mounted on the mud guard, of means for indicating the direction and extent of direction of turning of the front wheels by means of the steering wheel or equivalent steering manipulating element. Such arrangement provides for indication to drivers of other cars, pedestrians, traffic officers and others whether located to the front of the car on either side of, or to the rear on either side of the car or on either side directly of the car. The utility of the head lamps in being turned in direction and extent of turning is of special value at night thereby serving to indicate by the angle of projection of the light to the longitudinal center line of the vehicle the degree of turning of the front guiding wheels.

Preferably the clearance between the peripheries of the front and rear screens 41 and the housing 39 is closed by means of plates 80 of glass, celluloid or the like.

Also preferably, the rear screen 81 is provided with a silvered or other mirror surface, which may be concaved for mirrorscope effect, to afford rear-vision to the driver or occupants of the vehicle.

The invention is also advantageous in that the light afforded by the head lamps is projected forwardly of the car on the ground to which the car is directly approaching thereby revealing to the driver the condition of the roadway over which the wheels of the car are about to pass.

The invention is also applicable in that the light of the head lamps when turning the corner is moved in a direction from the eyes of the operator of any car or other vehicle approaching in the opposite direction.

Whereas, I have described my invention by reference to specific forms thereof it will be understood that many changes and modifications may be made without departing from the spirit of the invention.

I claim.

1. The combination of the steering gear for a vehicle or the like, of a lamp carried by said vehicle and means connecting said lamp with said steering gear whereby said lamp is turned laterally from straight-ahead position in direction and extent corresponding to the direction and extent of turning of said steering gear and for positively returning the lamp to straight-ahead position.

2. The combination with the steering gear for a vehicle or the like, of a lamp normally carried in straight-ahead position by said vehicle and means for connecting said lamp with the steering gear for laterally turning said lamp from straight-ahead position in the same direction and to the same extent corresponding to the direction and extent of turning of the steering gear, and for positively returning the lamp from any lateral position to straight-ahead position, said means comprising solely elements of rigid material and pivotally connected respectively to one another.

3. The combination with the steering gear of an automobile or the like, of a lamp serving as a lighting device in the normal use of the automobile, indicating means having a movable dial and observable in daylight, means for mounting said lighting device to be turned laterally from straight-ahead position and means for turning said lighting device and for moving said movable dial in direction and extent corresponding to the direction and extent of turning of the steering gear and for positively returning the lamp to straight-ahead position, said means comprising solely elements of rigid material and pivotally connected respectively to one another.

4. The combination of an automobile having a steering gear, a lamp normally carried by the automobile to project its light straight-ahead outwardly of the automobile, means for rotatably mounting said lamp on said automobile and means connecting said lamp with said steering gear whereby the lamp is rotated to an extent corresponding to the extent of turning of said steering gear and for positively returning the lamp to straight-ahead position, said means comprising solely elements of rigid material and pivotally connected respectively to one another.

In testimony whereof I have signed this specification this 12th day of April 1922.

ARTHUR P. BAMFORD.